United States Patent
Weinstein et al.

(10) Patent No.: US 7,862,125 B2
(45) Date of Patent: Jan. 4, 2011

(54) SEAT BELT BUCKLE POSITIONER

(76) Inventors: Elisabeth Weinstein, 1702 Morton St., Ann Arbor, MI (US) 48104; Robert E. Weinstein, 37495 Eagle Trace, Farmington Hills, MI (US) 48331

( * ) Notice: Subject to any disclaimer, the term of this patent is extended or adjusted under 35 U.S.C. 154(b) by 0 days.

(21) Appl. No.: 12/630,479

(22) Filed: Dec. 3, 2009

(65) Prior Publication Data

US 2010/0078986 A1  Apr. 1, 2010

Related U.S. Application Data

(63) Continuation of application No. 11/678,095, filed on Feb. 23, 2007, now Pat. No. 7,648,208.

(51) Int. Cl.
  *B60R 22/03* (2006.01)
(52) U.S. Cl. .................................... 297/481
(58) Field of Classification Search ................ 297/481
  See application file for complete search history.

(56) References Cited

U.S. PATENT DOCUMENTS

| | | | | |
|---|---|---|---|---|
| 3,125,374 A | * | 3/1964 | Bissell | 297/475 |
| 3,228,726 A | * | 1/1966 | Petersen | 297/481 |
| 3,279,851 A | * | 10/1966 | Hinchcliff | 297/481 |
| 3,287,063 A | * | 11/1966 | Nicholas | 297/475 |
| 3,291,526 A | * | 12/1966 | Nicholas | 280/807 |
| 3,314,719 A | * | 4/1967 | Johnson | 297/481 |
| 3,321,244 A | * | 5/1967 | Ivor et al. | 297/476 |
| 3,455,603 A | * | 7/1969 | Nicholas | 297/475 |
| 3,576,346 A | * | 4/1971 | Hutchinson | 297/481 |
| 3,659,801 A | * | 5/1972 | Romanzi, Jr. | 242/379 |
| 3,811,703 A | * | 5/1974 | Turkovich | 297/474 |
| 4,133,556 A | * | 1/1979 | Glinski | 280/801.1 |
| 4,372,613 A | * | 2/1983 | Kitakami et al. | 242/377 |
| 4,400,015 A | * | 8/1983 | Ryu | 280/807 |
| 4,431,233 A | * | 2/1984 | Ernst | 297/468 |
| 4,451,087 A | * | 5/1984 | Tamamushi | 297/468 |
| 4,542,939 A | * | 9/1985 | Geoffrey | 297/481 |
| 4,611,854 A | * | 9/1986 | Pfeiffer | 297/468 |
| 5,951,112 A | * | 9/1999 | Hansson | 297/482 |
| 7,118,132 B2 | * | 10/2006 | Terasaki | 280/806 |
| 7,648,208 B2 | * | 1/2010 | Weinstein et al. | 297/481 |
| 7,648,209 B2 | * | 1/2010 | Weinstein et al. | 297/482 |
| 2004/0207245 A1 | * | 10/2004 | Baylis | 297/481 |

* cited by examiner

*Primary Examiner*—Rodney B White
(74) *Attorney, Agent, or Firm*—Robert R. Deleault, Esq.; Mesmer & Deleault, PLLC

(57) ABSTRACT

A seat belt device for stabilizing and positioning a flexible vehicle seat belt buckle having a substantially rigid support structure configured for combining with a vehicle seat belt buckle to convert a movable, flexible vehicle seat belt buckle to a substantially stationary seat belt buckle for facilitating engagement of a seat belt latch. The support structure includes splinting configurations and wedging configurations.

8 Claims, 7 Drawing Sheets

*Prior Art*

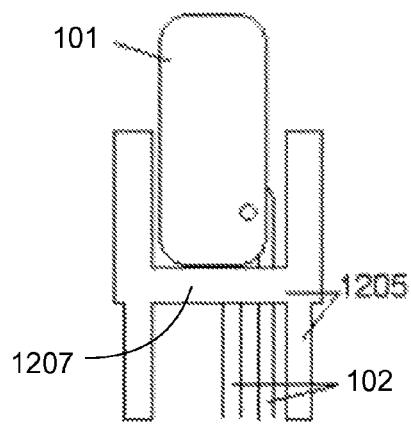
Fig. 8A
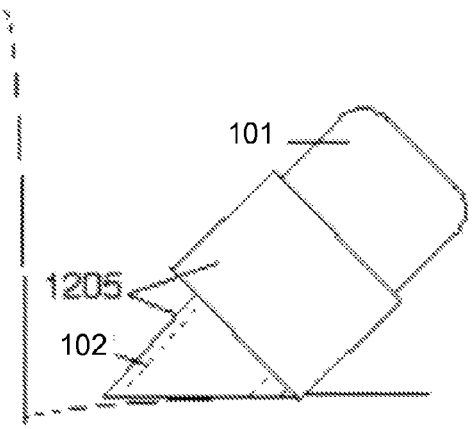
Fig. 8B
Fig. 9
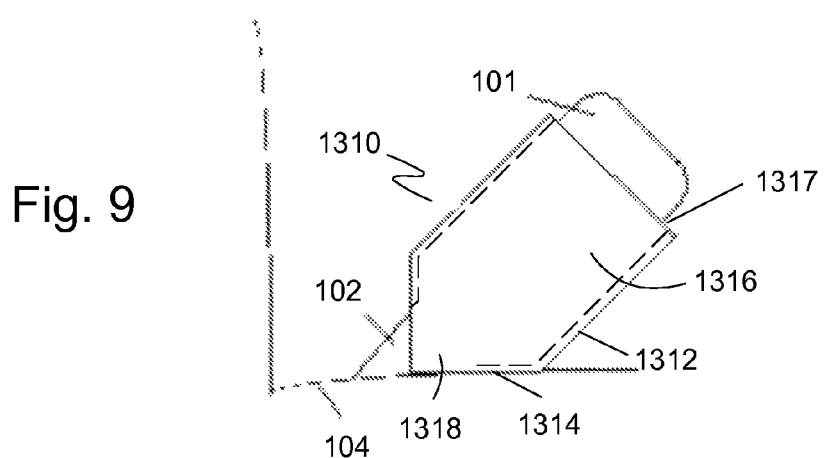
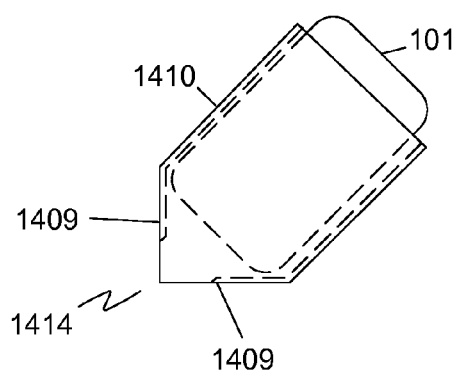
Fig. 10A
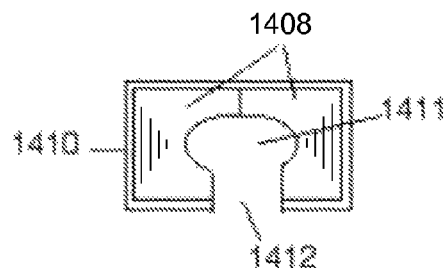
Fig. 10B

SEAT BELT BUCKLE POSITIONER

This application is a Continuation Application of Ser. No. 11/678,095, filed on Feb. 23, 2007, now U.S. Pat. No. 7,648,208 B2.

BACKGROUND OF THE INVENTION

1. Field of the Invention

The present invention relates generally to automotive safety restraints. Particularly, the present invention relates to automotive safety restraints and their use with child booster seats.

2. Description of the Prior Art

It is well established that the use of restraints worn across the lap and chest, commonly referred to as "seat belts," increases the safety of individuals riding in motor vehicles, both for operators and passengers. In the United States, all states have laws regarding the use of such safety restraints. Some of these laws are regarded as "primary" meaning that, in States having such "primary" safety restraint laws, a citation can be written whenever a policeman sees a moving car without a seat belt being used. The remaining States have safety restraint laws considered "secondary," meaning that an officer cannot intervene for not using seat belts but can issue a citation for not doing so if the vehicle is stopped for another reason.

Special apparatus designed for infants and children weighing less than 30-40 pounds are in common use. Referred to as "infant car seats," these are secured directly to the seat of the vehicle. The child is held within these "infant car seats" by appropriately sized restraints that are integral with the seat. For older children weighing over 30-40 pounds and too large to fit into an infant seat, booster seats that position the child to appropriately utilize adult seat belts are recommended for automotive safety. All states require safety seats for children under four years old, and many states require older children to use car booster seats, some mandating booster seat use up to age eight.

The National Highway Traffic Safety Administration (NHTSA) recommends the use of booster seats for all older children up to fifty-seven inches in height. Despite encouragement by safety organizations such as NHTSA, use of booster seats for children between the ages 4 to 8 has been reported to be below 20% in contrast to the use of infant safety seats greater than 80% for infants below the age of 4.

Some booster seats consist essentially of a child-sized seat on a low raised platform. An example of such a basic child booster seat is the Graco TurboBooster (Model 8491 SCT) produced by Graco Children's Products of Exton, Pa. This model has no back, and the child's back rests against the vehicle seat back. The Graco TurboBooster model incorporates armrests that also serve to position the child in the seat. Graco indicates this model to be appropriate for children between the ages of 3 and 10 years old, who weigh between 30 and 100 pounds, are between 38 and 57 inches in height, and whose ears are below the top of the vehicle seat cushion/headrest. The booster seat is placed freely upon the vehicle seat, and the child and booster seat are secured by buckling the seat belt of the vehicle about the child. Other examples of child booster seats without backs and similar in design to the Graco TurboBooster are the Cosco Ambassador (Model 220296-WAL) produced by Cosco, a division of Dorel Industries, Montreal, Canada, and Evenflo Big Kid (Model 2791694) produced by Evenflo Corporation of Piqua, Ohio.

Some booster seat models are more elaborate and have backs. These are exemplified by the Graco TurboBooster SafeSeat (Model 10-8673FIC) and the Britax Parkway (Model E904157) produced by Britax Corporation, Charlotte, N.C. The Graco TurboBooster SafeSeat model has armrests, whereas the Britax Parkway is a model that does not. The molded back configuration of the Britax booster seat helps to position the child.

All such booster seat models sit freely on the vehicle seat and when in use, both the child and seat are strapped, as a unit, by the vehicle seat belt. In concept, the seat belt serves to limit the motion of both the child and the booster seat in a forward crash. When the child is then thrown forcefully back, the unfixed booster seat is thought to act as a buffer to cushion the child's rebound. This is opposed to the child being thrown forward and away from a seat that is fixed to a vehicle, in which case the seat would not cushion the rebound. Booster seats with and without backs appear to operate this way in a collision, and there is limited data to suggest enhanced safety of one design over another. When booster seats are used, it is desirable that the positioning of restraints for children be the same as for an adult; that is, for the lap portion of the restraint to fit snugly cross the child's lap, and the "shoulder" portion of the restraint to cross the collar bone (not the face or throat) and chest.

The process of "buckling" a seat belt involves inserting a "latch plate," typically a flat metal configuration at the end of retractable seat belt webbing, into a "clasp," "latch," or "buckle" (synonymous) that is anchored to the body of the vehicle. The latch plate and the buckle are secured together by a clasping mechanism within the buckle, and the latch plate is released by a release mechanism within the buckle. Such devices are well known in the art. The process of putting a child in a booster seat involves first positioning the booster seat on the vehicle seat, seating the child upon it, drawing the seat belt across the child and booster seat, and finally inserting the seat belt latch plate into the seat belt buckle to buckle the belt about both the child and booster seat.

Rear seat belt buckles are generally positioned approximately in the vicinity of the junction of the seat and seat back of the vehicle, and they may be somewhat extended or recessed relative to the seat. Often, the buckle is anchored to the vehicle by a movable material such as ordinary seat belt webbing. FIGS. 1A and 1B illustrate a typical seat belt buckle. FIG. 1A illustrates the relative position of a rear seat belt buckle 101 to the seat 100. FIG. 2 A illustrates the flexibility of the web material 102 and the relative movement of buckle 101 to the web material 102. This flexible arrangement allows the buckles to be moved out of the way when not in use to secure a passenger, and does not ordinarily pose a problem for adult use. A seated adult can look down to visualize the buckle or easily reach down to feel for the buckle. If needed, a seated adult can use one hand to hold the buckle steady and the other hand to insert the latch plate.

In the case of using a child booster seat, it is recognized that when a booster seat is placed on a vehicle seat, the seat belt buckle typically becomes visually obscured from an adult positioned at the vehicle door. Visualizing the buckle requires bending into the vehicle to look over the booster seat. With a booster seat in place, the seat buckle is accessed only by reaching over the booster seat. An individual wishing to secure a child into a seat belt is characteristically required to look over both the child and the booster seat to find the buckle, as it usually cannot be readily seen over the booster seat and child's legs. The individual must then reach over the child and the booster seat to insert the latch plate into the buckle. These problems are amplified by booster seats with armrests that further obscure view and manual access to the buckle.

All of these hindrances to buckling a child into a booster seat are greatly amplified when the buckle is not stationary, but movable as at the end of flexible seat belt webbing. The movable buckle may retract into the crease between the seat and seat back, or the booster seat may move on top of the buckle and obscuring it when the child gets into the seat. Because the buckle is not fixed in place, an adult has to lean far over the child and use two hands to buckle the child, one to find and hold the buckle and the other to insert the latch. If the booster seat has moved to cover the buckle in the process of the child getting into the seat, the adult is required to move the booster seat about or tilt it with the child in it to grope for the buckle. If the child is irritable or uncooperative, these difficulties with buckling a child in a booster seat are, of course, worsened.

An alternative to leaning into the vehicle and over the child to buckle a seat belt is for the individual to place the child into the booster seat, close the vehicle door, and enter the other side of the vehicle in order to better visualize and access the seat belt buckle. This has the drawback of leaving the child alone in the vehicle momentarily. By the time the adult reaches the other side, the child may move, get out of the seat, doze off, or even fall out of the seat. The option of buckling a child from the "other side" is therefore not usually convenient or desirable, and also is not a viable option if there are intervening children seated.

In the event of two or three child seats next to each other, finding a movably attached seat belt buckle may require manual separation of the child seats, and groping or "fishing" into a narrow space between adjacent child seats or under adjacent seats (that may have children in them). Buckling a child when adjacent booster seats are present may require contorting to hold the seats apart with one hand and attempting to negotiate the latch plate into the moving buckle with the other. Importantly, if the buckle is not clearly visualized or positively accessed, there is an added risk of the seat belt not being properly fastened. Lastly, leaning over the child to find the buckle and buckle the seat belt necessitates placing an ear in direct proximity to the child's mouth for the duration of the procedure. This is unpleasant if the child is crying or screaming.

Therefore, what is needed is an apparatus that improves upon the above-described inconveniences and problems. What is also needed is an apparatus that positions and immobilizes vehicle seat belt buckles for easier accessibility when used with a child booster seat. What is further needed is an apparatus that encourages child booster seat use.

SUMMARY OF THE INVENTION

Booster seats are known to lessen morbidity and mortality in the event of an accident, getting children into booster seats is a present challenge and measures to facilitate ease and convenience of use of booster seats are desirable to foster compliance with using them. The present invention derives from a recognition that buckling a child in a booster seat poses difficulties when a seat belt buckle is flexibly or movably attached/anchored to a vehicle. The present invention seeks to improve upon these inconveniences and problems by providing a means to position and immobilize vehicle seat belt buckles so that they are more stationary and can be more easily accessed in conjunction with child booster seats. Despite the desired use of child booster seats in automobiles and other vehicles, devices to improve upon the aforementioned problems and thereby encourage booster seat use are not presently available.

Thus, it is an object of the present invention to provide a seat belt device that improves the convenience and reduces the difficulty of using child booster seats. It is another object of the present invention to provide a seat belt device that converts an unfixed and movable automotive seat belt buckle into a relatively stationary, fixed buckle. It is a further object of the present invention to provide a seat belt device that helps transform a movable seat belt buckle into a relatively fixed one, and thereby make it easier to buckle a child into a booster seat than at present. It is still another object of the present invention to provide a seat belt device that positions a seat belt buckle to where it is manually accessed more easily when using a child booster seat than at present. It is yet a further object of the present invention to provide a seat belt device that requires less exertion than is now required when buckling a child in a booster seat. It is another object of the present invention to provide a seat belt device that is relatively simple to use and inexpensive, that will improve upon the incompatibilities between the structures of seat belt buckles, which are movably attached to vehicles by flexible material, and child booster seats. It is still a further object of the present invention to provide a seat belt device that facilitates engagement of the vehicle seat belt when fastening a child in a vehicle booster seat within a vehicle. It is yet another object of the present invention to provide a seat belt device that is useful in buckling backward-facing infant seats in vehicles.

The present invention achieves these and other objectives by providing a seat belt device for stabilizing and positioning a flexible vehicle seat belt buckle. It includes a substantially rigid support structure configured for combining with a vehicle seat belt buckle to convert a movable, flexible vehicle seat belt buckle to a substantially stationary seat belt buckle for facilitating engagement of a seat belt latch. The support structure of the present invention includes both splinting configurations and wedging configurations. Examples of splinting configurations as will be described include a single splint, a double splint and a sleeve type splint which serve to immobilize flexible webbing. Examples of wedging configurations as will be described include a wedged buckle support, a wedged buckle support that includes a buckle housing, an angled sheet and a wedging sheet, all structures that wedge a seat belt buckle in relation to a vehicle seat. Some of the splinting configurations, as will be noted, can be adapted to have a wedging function by the inclusion of a base to rest on a vehicle seat.

An example of a splinting configuration is a single splint that connects to flexible webbing of a seat belt buckle and has an end adjacent to the seat belt buckle bottom. A variety of fastening devices can be used to install the single splint. The fastening devices include tapes, wraps, adhesives, clips, rivets, snaps, and any other mechanical means of holding the single splint to the seat belt webbing.

Another splinting configuration is a double splint that includes a pair of splints where the ends of each splint are positioned adjacent to the bottom of the seat belt buckle. The double splint also includes configurations where the end of one splint is positioned adjacent the bottom of the seat belt buckle and the end of the other splint is positioned along side the seat belt buckle, where both ends of the pair of splints are positioned along side the seat belt buckle, where one of the splints has a buckle support ledge positioned adjacent the bottom of the seat belt buckle, or where the pair of splints has a buckle supporting shelf between the splints.

Splinting configurations can be in the form of a sleeve that has a U-shaped cross-section and a longitudinal opening or slot sized to receive seat belt webbing. The sleeve has a top surface that is to be positioned adjacent the bottom of the seat belt buckle. The sleeve may be stackable with other sleeves to be adjustable for any length of a vehicle seat belt buckle and webbing.

An example of a wedging configuration includes a "wedged buckle support" that can be interposed between a vehicle seat and the bottom of a seat belt buckle, and that has an egress for the seat belt webbing. A preferred configuration has a first and a second base section that converges to form a V-shaped base portion for positioning upon a vehicle seat. A preferred configuration also incorporates a "buckle housing" to envelop and further support the buckle.

Preferred configurations of wedged buckle supports that incorporate a buckle housing may have various adaptations to support the bottom of a seat belt buckle, including a support shelf, or a tubular egress for webbing that can also support a buckle bottom. Wedged buckle supports may optionally include a spacer for placement inside of a structure or utilize an outside spacer. The buckle housing portion of the device may optionally include a notch area or other provision to prevent inadvertent misplacement and jamming of the seat belt latch between the buckle and buckle housing.

Other wedging configurations include an angled sheet and a wedging sheet, each having a webbing egress that is substantially centered in the sheet and an assembly slot connected to the webbing egress to provide a passageway for positioning the angled sheet or the wedging sheet around the seat belt webbing of a seat belt buckle. The angled sheet has a first sheet connected substantially perpendicularly to a second sheet. The wedging sheet may be flat or arcuate but must be firm yet flexible.

BRIEF DESCRIPTION OF THE DRAWINGS

FIG. 8A illustrates a narrow-side view of another embodiment of the present invention showing a structure that supports the seat belt webbing on at least two sides, the buckle on at least two sides and the buckle bottom.

FIG. 8B is a broadside view of the embodiment shown in FIG. 8A.

FIG. 9 is a broadside view of a wedging embodiment of the present invention showing a support structure that supports the webbing on at least two sides, the seat buckle on at least two sides and that has a base that can rest upon a vehicle seat.

FIG. 10A illustrates a broadside view of a simple configuration of the embodiment shown in FIG. 9 showing a seat belt buckle within the support structure with the bottom corners of the seat belt buckle resting upon the interior surface of the bases of the support structure FIG. 10B is a top view of the support structure shown in FIG. 10A and showing the interior of the support structure and the interior surfaces of the base of the support structure.

DETAILED DESCRIPTION OF THE PREFERRED EMBODIMENT

The support structure of the present invention includes both splinting configurations and wedging configurations. Examples of splinting configurations as will be described include a single splint, a double splint and a sleeve type splint which primarily serve to immobilize flexible webbing. Examples of wedging configurations herein described include a wedged buckle support, a wedged buckle support that includes a buckle housing, an angled sheet and a wedging sheet, structures that wedge a seat belt buckle in relation to a vehicle seat. Some of the splinting configurations, as will be noted, can be adapted to have a wedging function by the inclusion of a base to rest on a vehicle seat.

Figure 2A:
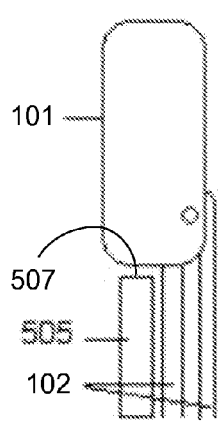
FIG. 2A illustrates a narrow-side view of one embodiment of the present invention showing a conventional seat belt buckle and a supporting or splinting structure adjacent to one side of the seat belt webbing.
Figure 2B:
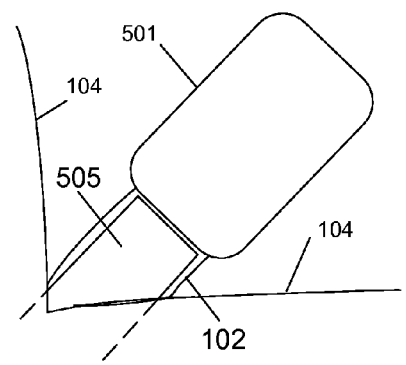
FIG. 2B illustrates a broadside view of the embodiment shown in FIG. 2A.

Various embodiment(s) of the present invention are illustrated in FIGS. 2-20. FIG. 2A illustrates a narrow-side view of a splinting configuration embodiment of the present invention. Splint structure 505 has the shape of a single splint, is substantially rigid, and is positioned to one side of the seat belt webbing 102. Splint structure 505 has a buckle bottom end 507, and splint structure 505 extends along a length of webbing 102 necessary to splint and immobilize the flexible seat belt webbing 102. Splint structure 505 is attached to webbing 505 by various means including, but not limited to, adhesives, clips, rivets, snaps, and other mechanical means. Splint structure 505 preferably extends to a point that is in close proximity to seat belt buckle 101. FIG. 2B illustrates a broadside view of the embodiment shown in FIG. 2A. It is noted that the length of splint structure 505 must be sufficiently long to penetrate the junction between the seat back and seat cushion to maintain the splinted seat belt in a relatively stationary position. As can be seen from FIGS. 2A and 2B, it is preferable that splint structure 505 is close to the seat buckle 101.

Figure 3A:
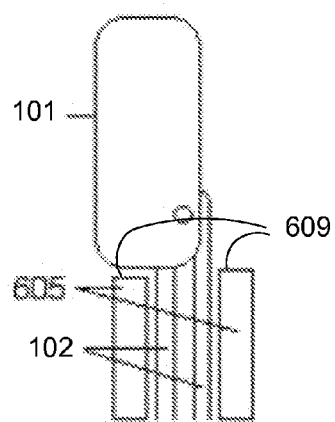
FIG. 3A illustrates a narrow-side view of another embodiment of the present invention showing a seat belt buckle and a splinting support structure adjacent to two sides of the seat belt webbing.

FIG. 3A illustrates a narrow-side view of another embodiment of the present invention. Splint structure 605 is a substantially rigid double splint that has two side supporting structures that are adjacent to two sides of flexible seat belt webbing 102. Like splint structure 505 in FIG. 2A, the supporting structures of splint structure 605 each have a buckle bottom end 609. The supporting structures of splint structure 605 are positioned on each side of webbing 102 a may be attached to each other and/or to the webbing 102 by various means including, but not limited to, by screws, snaps, adhesives, reversible adhesives, hook-and-loop type fasteners, and other non-reversible and reversible fastening means.

Figure 3B:
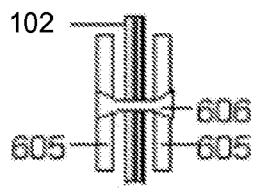
FIG. 3B illustrates a cross-section view of one embodiment of the embodiment in FIG. 3A showing a joining means connecting the two sides of the support structure.

FIG. 3B illustrates a cross-sectional view of flexible seat belt webbing 102 between support structures of splint structure 605. The two side supporting structures of splint structure 605 are depicted held together with a joining means 606, for example, a rivet, bolt, clip, or snap that may or may not pass through the webbing.

Figure 3C:
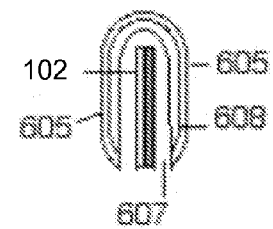
FIG. 3C illustrates a cross section view of another embodiment of the embodiment in FIG. 3A showing the splinting support structure partially encircling the seat belt webbing.

FIG. 3C illustrates a cross-sectional view of another embodiment of splint structure 605. Splint structure 605 in this embodiment is a sleeve that has a somewhat tubular shape with an open portion 607 for receiving flexible webbing 102 therein. Splint structure 605 partially encircles webbing 602 and has a cross-section that is U-shaped. It is anticipated that this embodiment of splint structure 605 might be longitudinally unitary, or might consist of multiple pieces or sections that can be "stacked" along the length of the webbing with the number of sections contingent upon the height of the section and the length required to splint the webbing 102. Stackable sections might be configured to fit into each other where one end may include a stacking groove 608 for receiving a mating portion of an adjacent stackable section. Other web-splinting circling configurations might include a continuous coil that winds about the webbing and serves to stiffen or splint it, and elastic or inflatable sleeves that might be positioned about the webbing, perhaps by being slipped over the buckle, to result in support on at least two sides of the webbing 102.

Figure 1B:
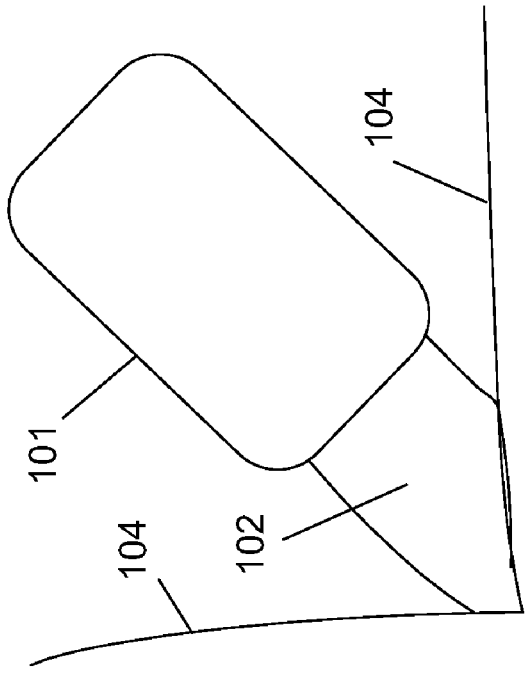
FIG. 1B illustrates a broadside view of a conventional vehicle seat belt buckle showing the seat belt buckle as it naturally extends diagonally upward from a vehicle seat.
Figure 1A:
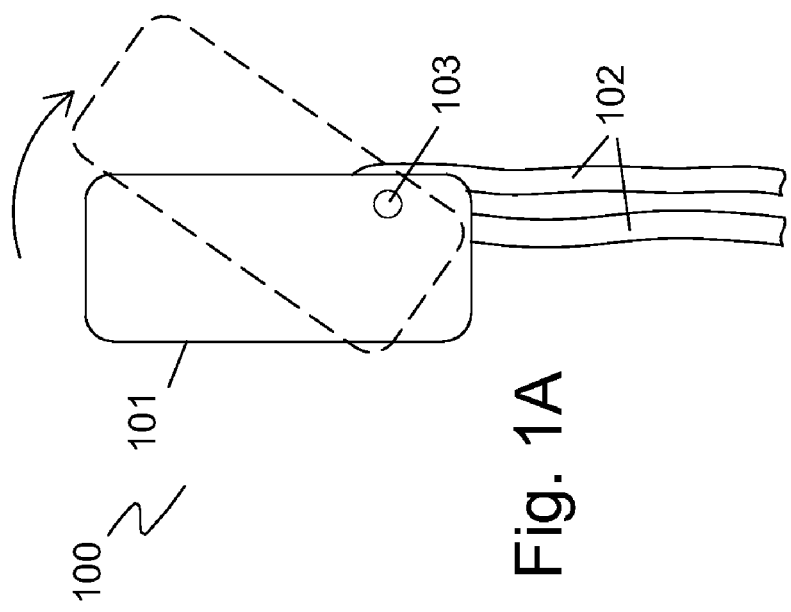
FIG. 1A Illustrates a narrow-side view of a conventional vehicle seat belt buckle showing the seat belt buckle with flexible seat belt webbing that extends downward from the bottom of the buckle and the rotation of the buckle about its attachment to the seat belt webbing.
Figure 4A:
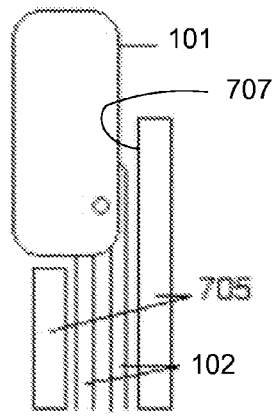
FIG. 4A illustrates a narrow-side view of another embodiment of the present invention showing a seat belt buckle and a splinting support structure adjacent to two sides of the seat belt webbing and one side of the buckle, the side to which the buckle tends to rotate on it's attachment webbing.
Figure 4B:
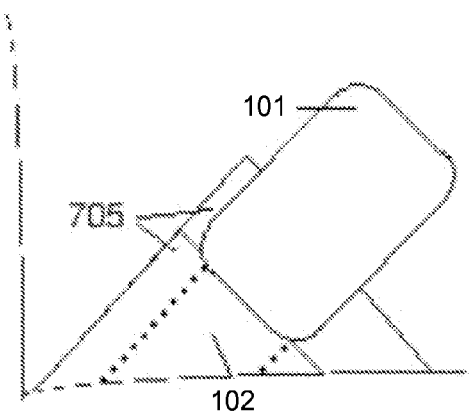
FIG. 4B illustrates broadside view of the embodiment shown in FIG. 4A.

FIG. 4A illustrates a narrow-side view of another splinting embodiment of the present invention. Splint structure 705 has two side supporting structures that are adjacent to two sides of flexible seat belt webbing 102. Like splint structure 605 in FIG. 3A, the supporting structures of splint structure 705 that are positioned on each side of webbing 102 a may be attached to each other and/or to the webbing 102 as disclosed above for the embodiments in FIG. 3A, 3B or 3C. Splint structure 705, however, has an added feature. One supporting structure of splint structure 705 is longer that the other supporting structure, which has a buckle side 707 that is positioned along the side of seat belt buckle 101. In this configuration, splint structure 705 is positioned to prevent rotation of the buckle in the direction illustrated in FIG. 1A. FIG. 4B illustrates a broadside view of the embodiment shown in FIG. 4A.

Figure 5A:
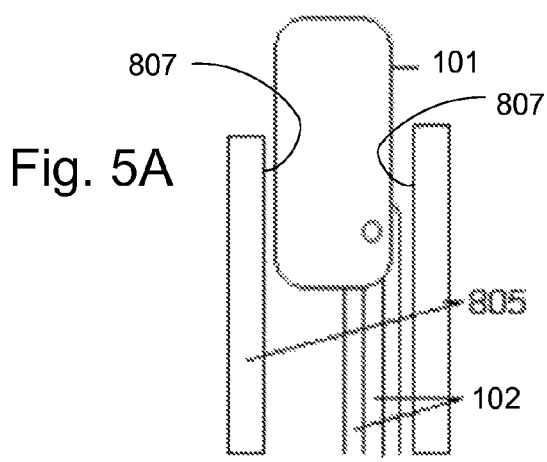
FIG. 5A illustrates a narrow-side view of another embodiment of the present invention showing a conventional seat belt buckle and a supporting structure adjacent to two sides of the seat belt webbing and two sides of the buckle.

FIG. 5A illustrates a narrow-side view of yet another splinting embodiment of the present invention. Splint structure 805 has two side supporting structures that each have a buckle side 807 and that are adjacent to seat belt webbing 102 and both broadsides of the buckle 101. It is anticipated that the supporting structures may be joined to each other and/or to webbing 102 and buckle 101 if desired by screws, snaps, adhesives, reversible adhesives, hook-and-loop type fasteners, and other non-reversible and reversible fastening means. The supporting structure 805 may be configured to encircle the webbing and/or buckle, as illustrated in FIG. 3C.

Figure 5B:
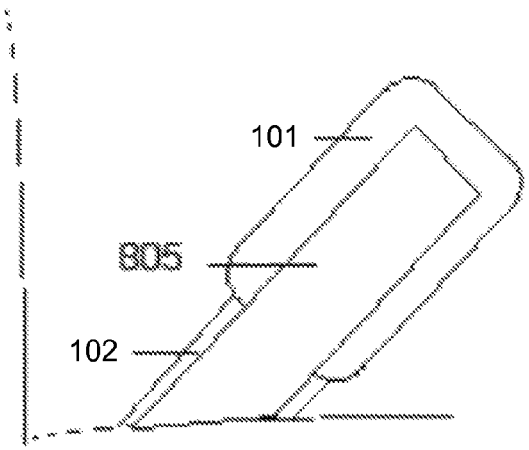
FIG. 5B illustrates a broadside view of the embodiment shown in FIG. 5A.

FIG. 5B illustrates a broadside view of the embodiment in FIG. 5A showing the relative position of splint structure 805 to the sides of the seat belt webbing 102 and buckle 101.

Figure 6A:
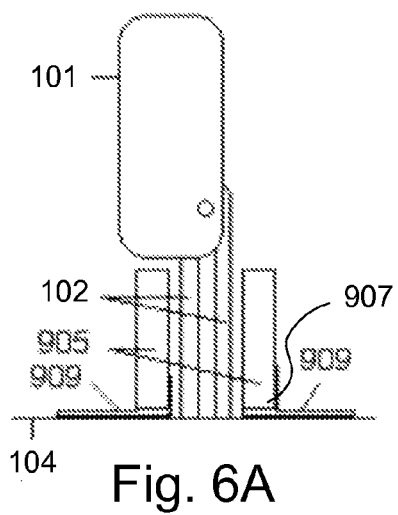
FIG. 6A illustrates a narrow-side view of another embodiment of the present invention showing a support structure that has a stabilizing base.

FIG. 6A illustrates a narrow-side view of another embodiment of the present invention. The splinting supporting structure 905 has a stabilizing base end 907 that connects to a stabilizing base 909 and supports webbing 102 on two sides. Stabilizing base 909 is configured to rest upon a vehicle seat 104 and to stand the supporting structure 905 upright on seat 104, thereby also wedging the bottom of the buckle upward in relation to the vehicle seat.

Figure 6B:
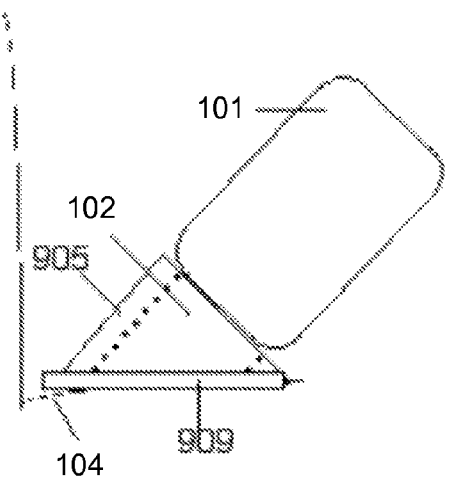
FIG. 6B illustrates a broadside view of the embodiment shown in FIG. 6A.

FIG. 6B illustrates a broadside view of the embodiment in FIG. 6A showing the relative position of supporting structure 905 to buckle 101, webbing 102 and seat 104. It should be understood that stabilizing base 909 and supporting structure 905 may be separate pieces that are independent of each other but placed/assembled together, may be integrally connected to each other, or may be molded or formed as a single piece.

Figure 7A:
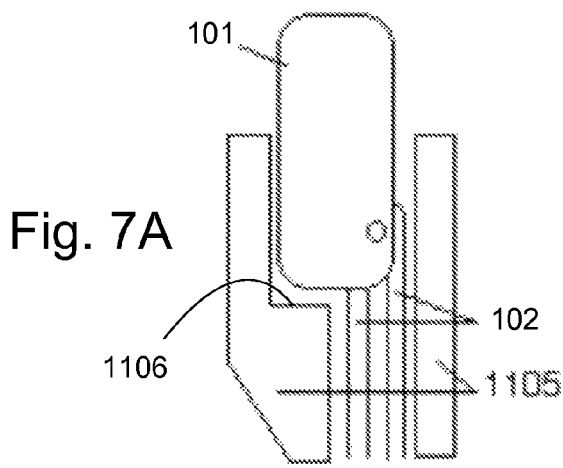
FIG. 7A illustrates a narrow-side view of a seat belt buckle with a supporting structure adjacent to two sides of both the seat belt webbing and buckle, with one side of the structure providing support to the bottom of the buckle.

Turning now to FIG. 7A, there is illustrated a narrow-side view of another embodiment of the present invention. Supporting structure 1105 has a pair of splinting supporting structures where one of the supporting structures has an inside support ledge 1106 that gives upward support to buckle 101 at its bottom surface. This embodiment functions to splint the buckle webbing and support the bottom of the buckle, but it is recognized that it can be devised to incorporate a base to additionally result in wedging between the vehicle seat and the bottom of the buckle.

Figure 7B:
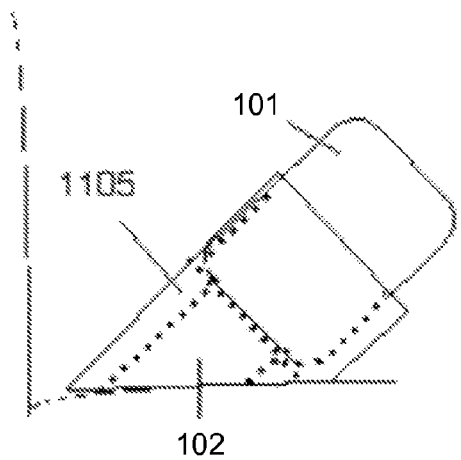
FIG. 7B illustrates a broadside view of the embodiment shown in FIG. 7A.

FIG. 7B illustrates a broadside side view of the embodiment in FIG. 7A showing a seat belt buckle 101 that has supporting structure 1105 splinting two sides of the seat belt webbing 102, both of the wide sides of the buckle 101, with one side of the structure giving upward support to the buckle 101 at its bottom surface.

Turning now to FIG. 8A, there is illustrated a narrow-side view of another embodiment of the present invention. In this embodiment, support structure 1205 has two supporting sides 1206 and a buckle supporting shelf or ledge 1207. Support structure 1205 supports the seat belt webbing 102 on at least two sides, the seat belt buckle 101 on at least two sides and the buckle's bottom by way of buckle supporting shelf 1207. It is understood that the support structure has a slot (not shown) in the buckle supporting shelf 1207 for the seat belt webbing to traverse. This embodiment functions to splint the buckle webbing and support the bottom of the buckle, but can be also devised to incorporate a base to additionally result in wedging between the vehicle seat and the bottom of the buckle.

FIG. 8B illustrates a broadside view of a buckle 101 with support structure 1205 that supports the seat belt webbing 102 on at least two sides, and the seat belt buckle 101 on at least two sides and on the buckle's bottom. Supporting structure 1205 may be unitary as illustrated in FIG. 8A or an assemblage of joined parts to support both the webbing 102 and seat belt buckle 101.

FIG. 9 illustrates a broadside view of a preferred wedging configuration embodiment of the present invention that is positioned on a vehicle seat 104. The support structure 1310 of this configuration partially envelops the buckle webbing 102 and buckle 101. The structure 1310 is seen to be held downward to the vehicle seat 104 by the buckle webbing 102, and to rest on a portion of its base 1314, thereby elevating and positioning the buckle 101 above the vehicle seat. Support structure 1310, which is also called a buckle housing, provides support to two sided of webbing 102 and buckle 101. Buckle housing 1310 has an enveloping wall structure 1312, a base portion 1314, a buckle compartment 1316 with a buckle open end 1317, and a webbing compartment 1318 with a webbing open end 1319. The inside of buckle housing 1310 has a buckle supporting component (not shown) that supports the bottom of the seat belt buckle. The buckle supporting component includes an interior base surface, a buckle support shelf or a shelf-like structure, and the like. Examples and features of such a buckle positioning structure are further explained below.

FIG. 10A illustrates a broadside view of one embodiment of the present invention as shown in FIG. 9. Support structure 1410 has a base 1409 that can rest upon a vehicle seat. The bottom corners of buckle 101 are seen to be resting upon the interior surface of the sections of base 1409 of support structure 1410 and are held in this position by the downward pull of the webbing 102 as illustrated in FIG. 9. In this embodiment, the area below the buckle bottom would be considered to comprise a "wedged buckle support," and the area above, a "buckle housing." The width of the base dimension that is close to the width of the narrow-side of an ordinary seat belt buckle has been found to suffice to keep such configurations upright on an automotive seat. Configurations with wider, longer, or larger bases, however, may be devised as desired.

FIG. 10B is a top view of the support structure 1410 of the embodiment shown in FIG. 10A. As if looking directly into an empty support structure 1410, FIG. 10B illustrates the interior surfaces 1408 of the base 1414. Also depicted is a webbing egress 1411 and assembly opening 1412. The two angled base sections 1409 are seen to join at a point on one side of support structure 1410.

Figure 11A:
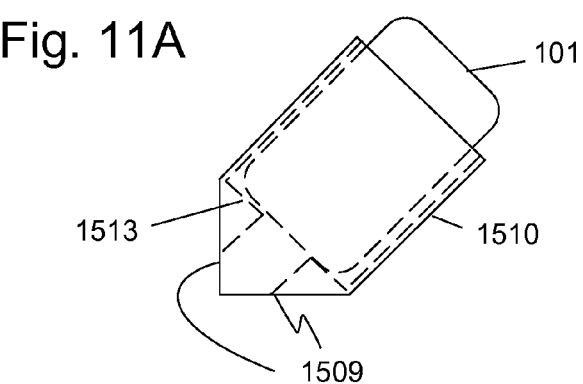
FIG. 11A illustrates a broadside view of another configuration of the embodiment shown in FIG. 9 showing a seat belt buckle resting upon a shelf within the support structure.

FIG. 11A illustrates a broadside view of another embodiment of the present invention shown in FIG. 9. Support structure 1510 has a base 1509 that can rest upon a vehicle seat. Support structure 1510 also includes a shelf 1513 that supports buckle 101 from its bottom surface. In this embodiment, the triangle described by the bases 1509 and the shelf 1513 comprise a "wedged buckle support" and the structure above that, a "buckle housing." More descriptively, the triangle formed by the bases 1509 and the shelf 1513 define the area of the device that provides support to the bottom of a buckle 101 and comprises the "wedged buckle support" of the embodiment. The remainder of the embodiment that extends from where the bottom of the buckle is situated and that helps to immobilize the buckle comprises the optional but preferred "buckle housing" of the device. It is anticipated that many designs that would function as a "buckle housing" are possible, including a broadly enveloping structure as herein illustrated, but even a simple strap might be devised.

Figure 11B:
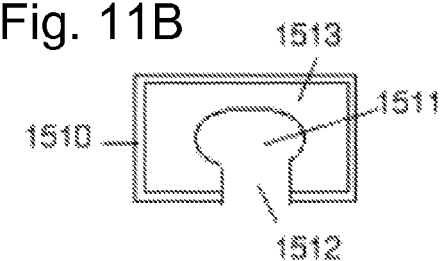
FIG. 11B is a top view of the support structure shown in FIG. 11A and showing the interior of the support structure and the support surface of the shelf.

FIG. 11B is a top view of the support structure 1510 of the embodiment shown in FIG. 11A. FIG. 11B illustrates an interior shelf 1513, an egress for the webbing though the shelf 1511, and an assembly opening 1512. As an alternative to a linear shelf illustrated in FIG. 11A, any configuration that is shaped to act as a shelf to support the bottom of buckle 101 may be used. A structure acting as a shelf to support the bottom of the buckle 101 might be an integral part of the device, for example, molded as part of the present invention, or might be separate and placed within the device.

Figure 12A:
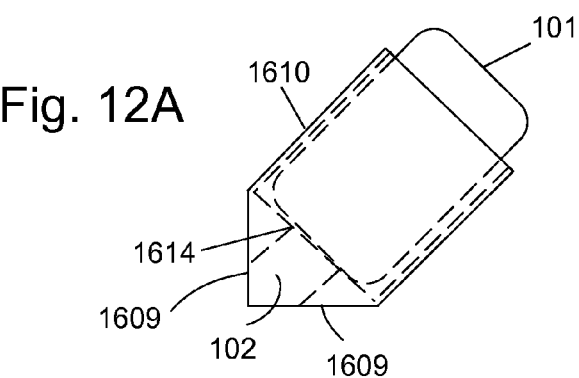
FIG. 12A illustrates a broadside view of another embodiment of the embodiment shown in FIG. 9 showing a seat belt buckle resting upon a molded channel for the seat belt webbing that acts as a shelf within the support structure.

FIG. 12A illustrates a broadside view of another embodiment of the present invention shown in FIG. 9. Support structure 1610 has a shelf-like structure 1614 that is essentially a molded channel that acts to provide support for the bottom surface of the buckle 101 and to provide an egress for the buckle webbing 102. In this embodiment, the triangle described by the bases 1609 and the top of the molded structure 1614 comprise a "wedged buckle support," and the structure above that, a "buckle housing."

Figure 12B:
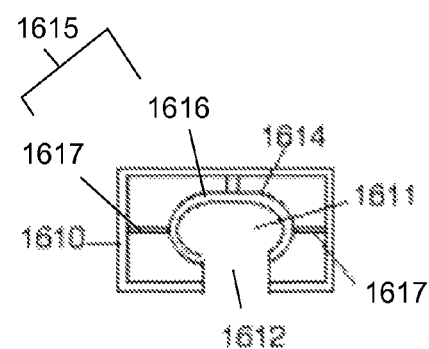
FIG. 12B is a top view of the support structure shown in FIG. 12A and showing the interior of the support structure and a molded channel for the webbing that acts as a shelf within the structure.

FIG. 12B is a top view of the support structure 1610 of the embodiment shown in FIG. 12A. FIG. 12B illustrates a molded channel 1614 with a webbing egress 1611 and a shelf-like structure 1615 constituted by an open-side tube structure 1616 a plurality of braces 1617 that together can provide shelf-like support to the bottom of a buckle 101. It is anticipated that, rather than having braces around the molded channel 1614, the area surrounding the channel might be solidly filled, or not filled at all. An assembly opening 1612 is also depicted through which the webbing can be passed to install the device in a vehicle.

Various configurations similar to those illustrated in FIGS. 9-12 have been tested in vehicles to ascertain that the vehicle seat belt buckle and webbing can be readily inserted into the device and then desirably positioned relative to the seat. In instances in which the webbing is relatively short and the buckle is close to the vehicle seat with the webbing extended, the spongy or spring-like seat and seat back material may need to be manually depressed to allow room for installation to be accomplished. After the buckle and webbing are inserted and the webbing is situated through the egress at the base of the structure, the base is then positioned on the vehicle seat. Tension on the fully extended webbing is required to keep the device upright and immobilize the buckle. In instances where the webbing is longer than usual, a spacer can be utilized.

Figure 13:
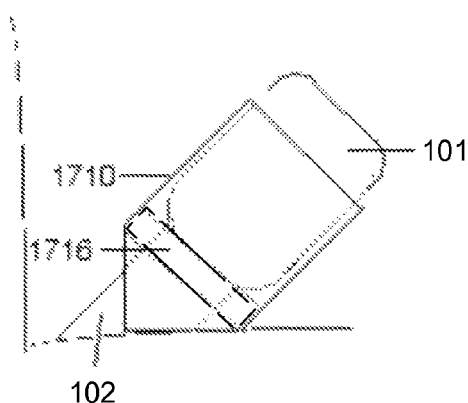
FIG. 13 illustrates a support structure akin to FIGS. 10-12 showing a spacer within the support structure for supporting a seat belt buckle.

FIG. 13 illustrates a broadside view of a wedging support structure 1710 akin to FIGS. 10-12. An internal, removable spacer 1716 is positioned within supporting structure 1710 to support the bottom of the seat belt buckle 101. It is intended for the flexible webbing 1702 to be fully extended and providing tension when the supporting structure 1710 is in position on a seat. To adjust for the length of the webbing that varies from vehicle to vehicle, one or more spacers such as internal spacer 1716 might be required. It is anticipated for internal spacer 1716 to also have an opening to allow the webbing 102 to traverse.

Figure 14:
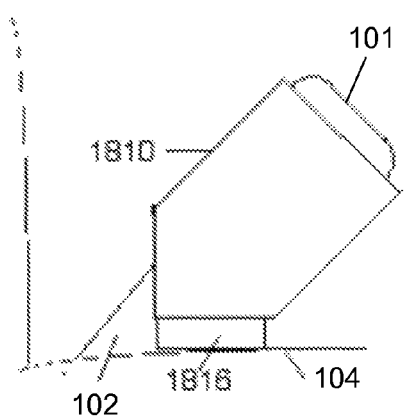
FIG. 14 illustrates a support structure akin to FIGS. 10-12 showing and a spacer interposed between the support structure and a vehicle seat.

FIG. 14 illustrates a broadside view of a supporting structure 1810 akin to FIGS. 10-12. An external spacer 1816 is interposed between supporting structure 1810 and a vehicle seat 104 to fully extend the flexible webbing 102 thereby providing tension between the device 1810 and the vehicle seat 104. It is anticipated that spacers that are external to the support structure would also have provision for the webbing to traverse. External spacers might stack to accommodate webbing of various lengths and/or interlock with the structure and/or each other.

Figure 15:
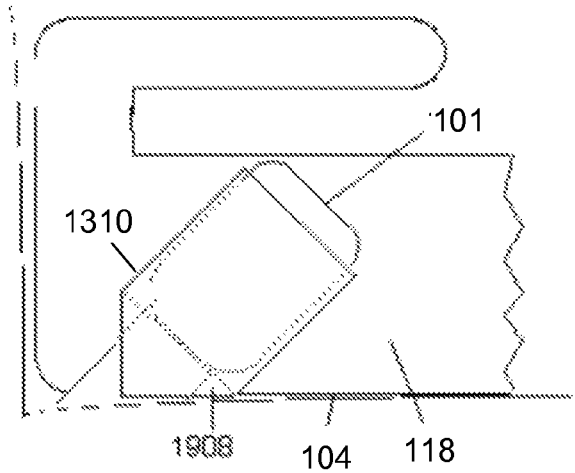
FIG. 15 illustrates a support structure of an embodiment in FIG. 9 showing the support structure positioned next to a child booster seat.

FIG. 15 is a side view of a supporting structure 1908 next to a child booster seat 1918 on a vehicle seat 104. In this relative placement, it can be seen that the position of the buckle 101 is readily known and accessed in relation to the booster seat as opposed to unknown, when it is flexibly movable and not reproducibly situated, visualized, or accessed for buckling.

Figure 16:
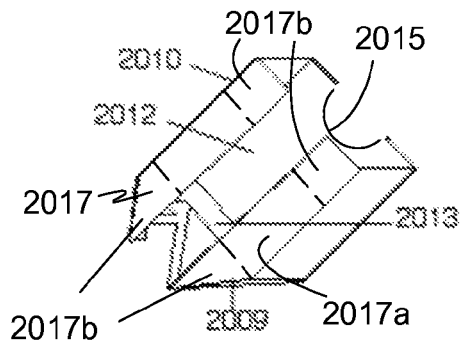
FIG. 16 is a perspective view of an embodiment of the present invention that is akin to FIGS. 11A and 11B.

FIG. 16 is a perspective view of a preferred embodiment of a support structure 2010 of the present invention. In this embodiment, support structure 2010 has a shelf 2013 to support the bottom surface of a seat belt buckle, and a base 2009 that can rest upon a vehicle seat. Support structure 2010 has an assembly opening 2012 that allows a buckle and webbing to be inserted into the structure. Once inserted, support structure 2010 would at least partially encircle a seat belt buckle and seat belt webbing. The buckle would be above the shelf 2013, and the webbing would extend through egresses in the shelf 2013 and base 2009. It is preferred that the base 2009 be configured to partially envelop the webbing such that the webbing not slip out unintentionally but require manual removal since positive containment of the fully extended webbing as it exits the base area 2009 would help to position the structure upright on the vehicle seat. In preferred embodiments, base 2009 is angled as illustrated such that the device can be used in either direction. Various alternative configurations of the base may be desired, such as an alternative angle, or rounding of the base to allow limited adjustment of the angle of the buckle to the seat.

A notch area 2015 may be optionally included on the back side of support structure 2010. Notch area 2015 helps to insure that, when a vehicle seat belt latch is inserted into the seat belt buckle within support structure 2010, the vehicle seat belt latch is not mistakenly jammed by a user between the seat belt buckle and the back side of support structure 2010 and thinking that the latch is secure. Notch area 2015 prevents the seat belt latch from being held in the event that the latch has been inadvertently jammed into the support structure. It should be understood that the retaining portions 2017 along the front side of the buckle housing portion of the support structure 2010 only need to be of sufficient surface area to retain the seat belt buckle within support structure 2010. For instance, retaining portions 2017 may be notched (as indicated by the reference number 2017a between the dashed lines) so that only a top and bottom segment (as indicated by the reference number 2017b) of retaining portions 2017 are used to retain the seat belt buckle within the buckle housing portion of the support structure 2010.

Figure 17A:
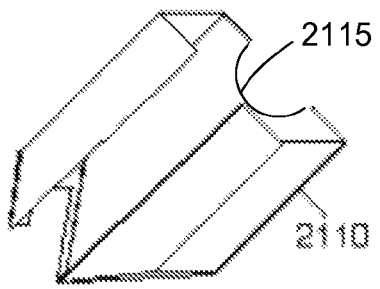
FIG. 17A is a perspective view of an embodiment of the present invention akin to FIGS. 10A and 10B.

FIG. 17A is a perspective view of a structure 2110 similar to that of FIG. 16, but without an internal shelf.

Figure 17B:
FIG. 17B is a perspective view of an insertion of the present invention showing a structure that might be placed within the support structure of FIG. 17A and that can act as a shelf to support the bottom of a seat belt buckle.

FIG. 17B is a perspective view of an insertion 2118 that might be placed within support structure 2110 and that can act as a shelf to support the bottom of a seat belt buckle.

Figure 17C:
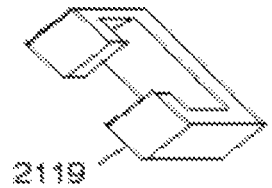
FIG. 17C is a perspective view of another embodiment of an insertion of the present invention showing a structure that might be placed within the support structure of FIG. 17A and that can act as a shelf to support the bottom of a seat belt buckle higher in the support structure than the insertion shown in FIG. 17B.

FIG. 17C is a perspective view of another embodiment of an insertion that might be placed within the structure 2110 of FIG. 17A. Insertion 2119 performs the function of a shelf to support the bottom of a seat belt buckle, situating it higher in the support structure than insertion 2118. Insertions 2118 and 2119 might be used together t as a shelf and a spacer.

Figure 18A:
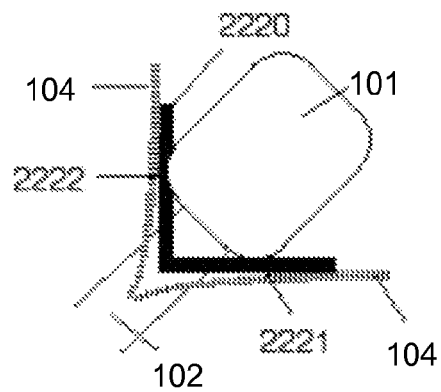
FIG. 18A illustrates a broadside view of another wedging configuration of the present invention showing a seat belt buckle supported by a support structure between the buckle bottom and a vehicle seat.

FIG. 18A is a side view of a buckle 2201 that is supported by another embodiment of a wedging support structure 2220 of the present invention. Support structure 2220 has two portions, a first sheet 2221 and a second sheet 2222. Support structure 2220 is adjacent to two sides of the webbing 102, to the buckle bottom, but not to the buckle sides of buckle 101. Interposition of this embodiment between the buckle 101 (in this case, the bottom corners) and the vehicle seat 104, extends the flexible webbing 102 and produces upward pressure upon the bottom of buckle 101 serving to position it upright. It is anticipated that various thicknesses of the device, layers, or spacers might be required to support buckle 101 in an upright position depending upon the length of the webbing 102. Various modifications of this configuration are anticipated, including modifications of the angle between the sections that rest upon the seat and backrest, or means to extend the webbing 102 and exert upward pressure on buckle 101 bottom such as a spring, elastic or spring-like material at the angle between portions 2221 and 2222 acting as a hinge. It is also anticipated that the area within the angle between the two sheets 2221 and 2222 might be fashioned to more closely approximate the shape of the bottom of the belt buckle and provide a surface upon which the span of the buckle bottom might rest.

Figure 18B:
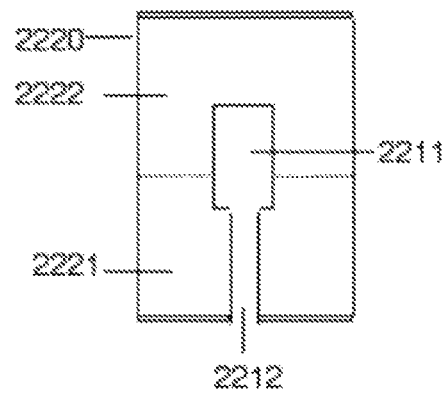
FIG. 18B is a frontal plan view of the embodiment shown in FIG. 18A showing the back and bottom surfaces of the support structure.

FIG. 18B is a frontal view of the support structure 2220. Portion 2221 rests upon the bottom of a vehicle seat and section 2222 against the backrest of a vehicle seat. The support structure 2220 has a webbing egress 2211 for the seat belt webbing and an assembly slot 2212 through which seat belt webbing can be inserted to install the device.

Figure 19:
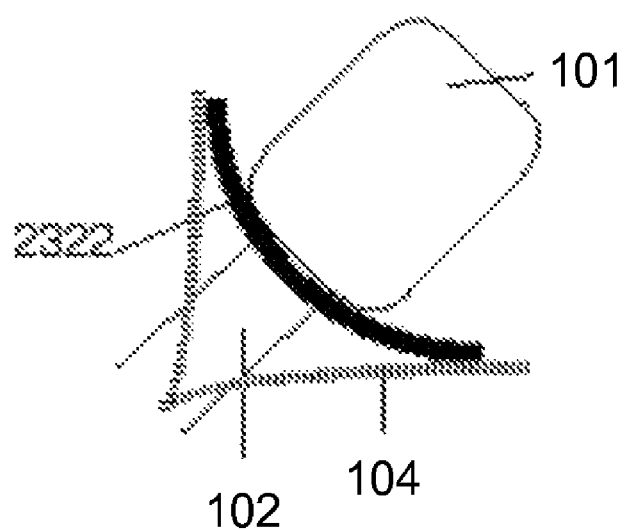
FIG. 19 illustrates a broadside view of another embodiment of the embodiment shown in FIG. 18A and showing a seat belt buckle supported by support structure.

FIG. 19 is a side view of a seat belt buckle supported by a straight or concave embodiment of the support structure of FIG. 18. Support structure 2322 is interposed between the seat belt buckle 101 and a vehicle seat 104 to extend the flexible webbing 102 and hold the buckle 101 in an upright position relative to vehicle seat 104. Support structure 2322 might be made of firm, but flexible material and exert upward force on the buckle 101 and downward force on the seat 104 because it is wedged into position. It is considered that many variations and configurations are possible, including those that can be stretched over a buckle for installation.

Figure 20:
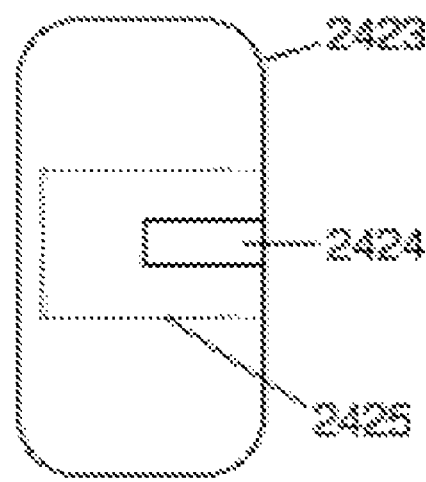
FIG. 20 illustrates a top plan view of a spanning adaptation for use in vehicles with uneven seat configuration in the area of the belt buckle.

FIG. 20 illustrates a spanning adaptation structure 2423 that is adapted for use in vehicles with an uneven seat configuration in the area of the belt buckle. It has been found that the seat is not flat in the area of the seat belt in some vehicles, but rather sculpted or recessed. In these instances, the uneven area can be converted to a flat surface for some supporting structures to rest upon, for example, the structures exemplified in FIGS. 9-12. Usually, a flat spanning surface that is a few inches wider than the base of such a device will suffice. It is preferable that the material be rigid enough to retain its shape against the downward pressure exerted by the buckle and upward pressure of the seat. The spanning adaptation structure 2423 is depicted to have a cut-out 2424 for receiving the webbing. The dotted line 2425 illustrates the area that a base of a configuration as in FIG. 9-12 might occupy.

While construction of the elements of the present invention with plastic molded parts would appear suitable, cost effective, and commensurate with the materials of child booster seats, it is anticipated that the device of the present invention might be constructed with other materials or a combination of materials including metal, rubber, fabric, and/or wood, and to include rigid, semi-rigid, or flexible parts.

Further adaptations and variations of the device of the present invention are contemplated. Further, the adaptations and variations embodied in U.S. Provisional Patent Application No. 60/777,762, filed Mar. 1, 2006, U.S. Provisional Patent Application No. 60/785,121, filed Mar. 23, 2006, U.S. Provisional Patent Application No. 60/808,347, filed May 25, 2006, and U.S. Provisional Patent Application No. 60/837,446, filed Aug. 11, 2006 are incorporated herein by reference. In addition, for example, configurations might extend into the crease between the vehicle seat and seat back or the space between the booster seat and the vehicle seat booster seat to position and stabilize them, and variations might include fixed or reversible attachment to the booster seat itself.

It can be appreciated that devices according to the present invention would act to hold an ordinary seat belt buckle in an area at the side of a booster seat that is stationary, knowable and readily accessed by a user. With the seat belt buckle stabilizing and positioning devices of the present invention, the seat belt buckle and seat belt latch plate are considerably more easily approximated and buckled, as compared to when the buckle is movable. Prototypes of the device have been found to facilitate buckling by a caregiver, and even allow consistent buckling by an older child (with adult checking, nonetheless, to insure that the child is secure). In use, an adult can use one hand to hold the child and the other to buckle the child, instead of requiring both hands to buckle a child in as is now often required.

The present invention thus teaches a device to overcome difficulties with using automotive child booster seats and methods for using such devices.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A seat belt device for stabilizing and positioning a flexible seat belt webbing and an attached seat belt buckle above a vehicle seat, the device comprising a wedging support structure that is a wedging sheet made of a firm but bendable material having a webbing egress located in a central portion of the wedging sheet and an assembly slot connected to the webbing egress wherein the wedging sheet is adapted to be positioned to engage a first end against a vehicle seat back and a second end against a vehicle seat bottom with the central portion forming a concave shape when a seat belt buckle with an attached flexible seat belt webbing is positioned through the assembly slot to the webbing egress, the wedging sheet being sized wherein the central portion provides a constant biasing pressure against the seat belt buckle to fully extend the seat belt webbing and maintain the seat belt buckle in an upright position above the vehicle seat when assembled to the seat belt buckle.

2. The device of claim 1 further comprising a means to extend the seat belt webbing and seat belt buckle positioned within a concave portion of the wedging sheet.

3. The device of claim 2 wherein the means to extend the seat belt webbing and seat belt buckle is material having a spring or elastic characteristic capable of exerting pressure against the seat belt buckle when assembled to the seat belt buckle.

4. A seat belt device for stabilizing and positioning a flexible seat belt webbing and an attached seat belt buckle above a vehicle seat, the device comprising:
   a wedging support structure comprising:
      a first sheet; and
      a second sheet connected to the first sheet along an edge defining a junction and an angle between the first sheet and the second sheet;
      a seatbelt webbing egress formed at the junction and extending into and through a portion of the first sheet and a portion of the second sheet; and
      an assembly slot extending from an outside edge of one of the first sheet or the second sheet and communicating with the seatbelt webbing egress, the assembly slot extending through one of the first sheet or the second sheet.

5. The device of claim 4 wherein the angle of the first sheet and the second sheet formed at the junction is in a range wherein a first bottom edge between opposing sides of the seatbelt buckle adjacent the seatbelt webbing is supported by the first sheet and a second bottom edge between opposing sides of the seatbelt buckle adjacent the seatbelt webbing is supported by the second sheet when the seatbelt webbing of the seatbelt buckle is positioned within the seatbelt webbing egress at the junction of first sheet and the second sheet.

6. The device of claim 4 further comprising a means to extend the seat belt webbing and seat belt buckle positioned within the angle between the first sheet and the second sheet.

7. The device of claim 6 wherein the means to extend the seat belt webbing and seat belt buckle is material having a spring or elastic characteristic capable of exerting pressure against the seat belt buckle when assembled to the seat belt buckle.

8. A seat belt device for stabilizing and positioning a flexible vehicle seat belt buckle, the device comprising:
   a substantially rigid support structure configured for combining with a vehicle seat belt buckle wherein the substantially rigid support structure supports a bottom of a vehicle seat belt buckle and positions the vehicle seat belt buckle in an upright position above a vehicle seat;
   a removable spacer to fully extend the flexible seat belt webbing situated between the vehicle seat and the vehicle seat belt buckle to convert a movable, flexible vehicle seat belt buckle to a substantially stationary seat belt buckle for facilitating engagement of a seat belt latch wherein the spacer is adapted to be positioned in a location selected from the group consisting of between a surface of the support structure and the bottom of a vehicle seat belt buckle, and between a surface of the support structure and a vehicle seat; and
   a spanning adaptation structure being a substantially flat sheet having a cutout on one side of the flat sheet wherein the cutout is narrower than the rigid support structure and wider than the seatbelt webbing wherein the spanning adaptation structure is adapted for placement between a vehicle seat and the rigid support structure.

* * * * *